Figure 1:
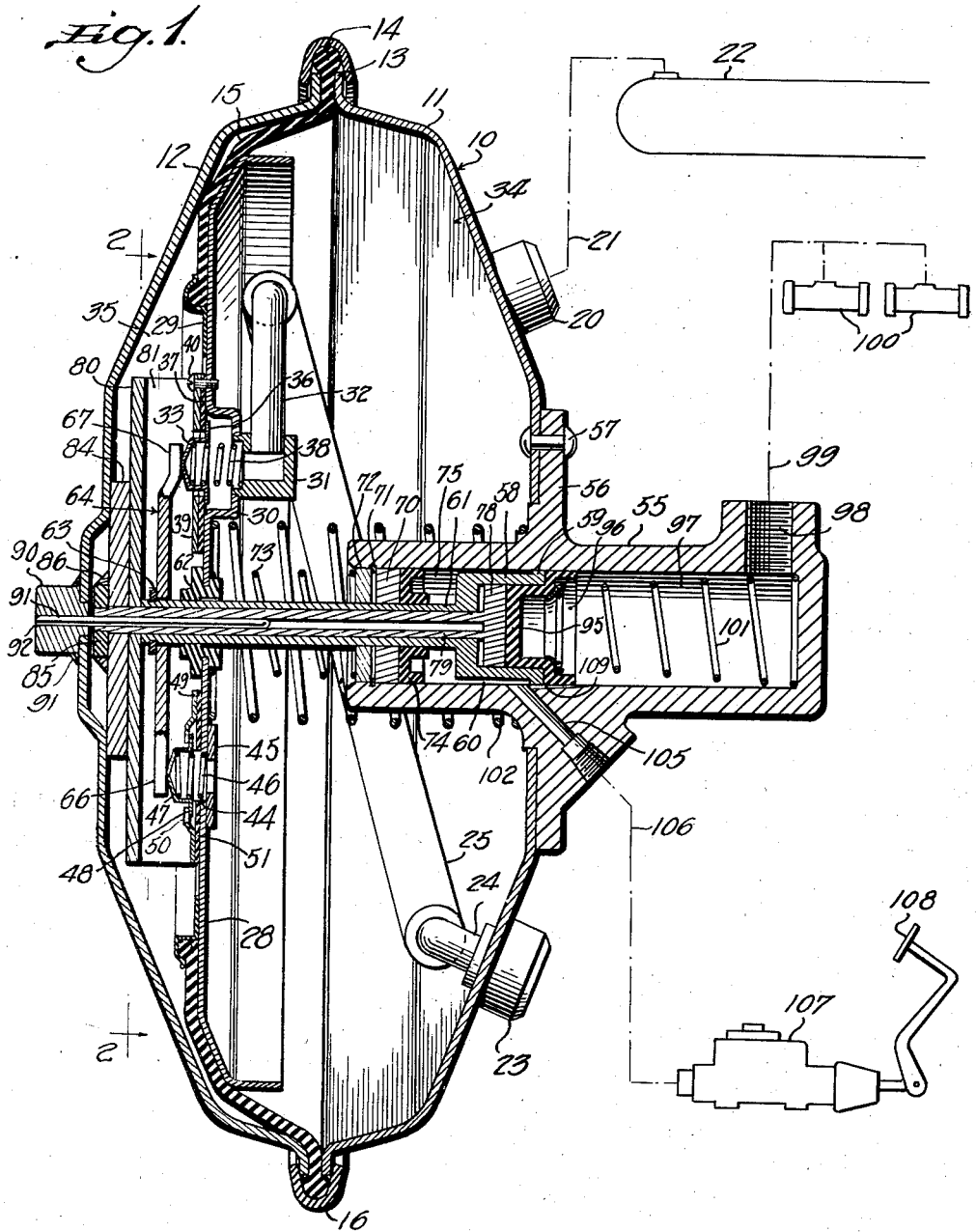

Sept. 17, 1946.  W. STELZER  2,407,856
HYDRAULIC BRAKE MECHANISM
Filed June 5, 1944  2 Sheets-Sheet 1

INVENTOR
WILLIAM STELZER
ATTORNEYS

Sept. 17, 1946.  W. STELZER  2,407,856
HYDRAULIC BRAKE MECHANISM
Filed June 5, 1944  2 Sheets-Sheet 2

INVENTOR
WILLIAM STELZER
BY
ATTORNEYS

Patented Sept. 17, 1946

2,407,856

UNITED STATES PATENT OFFICE 2,407,856

HYDRAULIC BRAKE MECHANISM

William Stelzer, East Orange, N. J.

Application June 5, 1944, Serial No. 538,844

14 Claims. (Cl. 60—54.5)

This invention relates to hydraulic brake mechanisms and particularly to a vehicle booster brake mechanism of the type wherein the booster unit is connected to the master cylinders and to the wheel cylinders by hydraulic lines and wherein displacement of fluid from the master cylinder energizes the booster motor and assists the latter in applying the brakes.

An important object of the invention is to provide a power operated brake mechanism of the general character referred to wherein greater simplicity in the booster structure is obtained, thus substantially reducing the cost of manufacture of the booster unit.

A further object is to provide a booster brake mechanism wherein the usual separate motor-control cylinder and pressure cylinder in which pressure is generated to apply the brakes are combined into a single cylinder, thus reducing the overall length of the device and minimizing the number of parts without sacrificing any efficiency in operation.

A further object is to provide such a device wherein the housing shells for the fluid pressure operated motor diaphragm are relieved of tension, thus permitting them to be made of lighter material.

A further object is to eliminate the usual check valve controlling communication between the control and pressure cylinders and through which fluid leakage from the pressure end of the system is replenished, without sacrificing the function of such check valve.

A further object is to provide a booster motor of the type referred to wherein the efficiency of the pressure packing cup and the life of such cup is very greatly increased by reducing differential pressures affecting such cup as a result of the use of a single cylinder as referred to above, the packing cup being subjected at one side to maximum brake pressures and at the other side to master cylinder pressures rather than to atmospheric or sub-atmospheric pressures.

A further object is to provide such a booster wherein the advantages referred to are obtained while still permitting the use of simple poppet valves to control the motor and through which a perfect follow-up action of the parts is obtained.

Other objects and advantages of the invention will become apparent during the course of the following description.

In the drawings I have shown one embodiment of the invention. In this showing—

Figure 2:
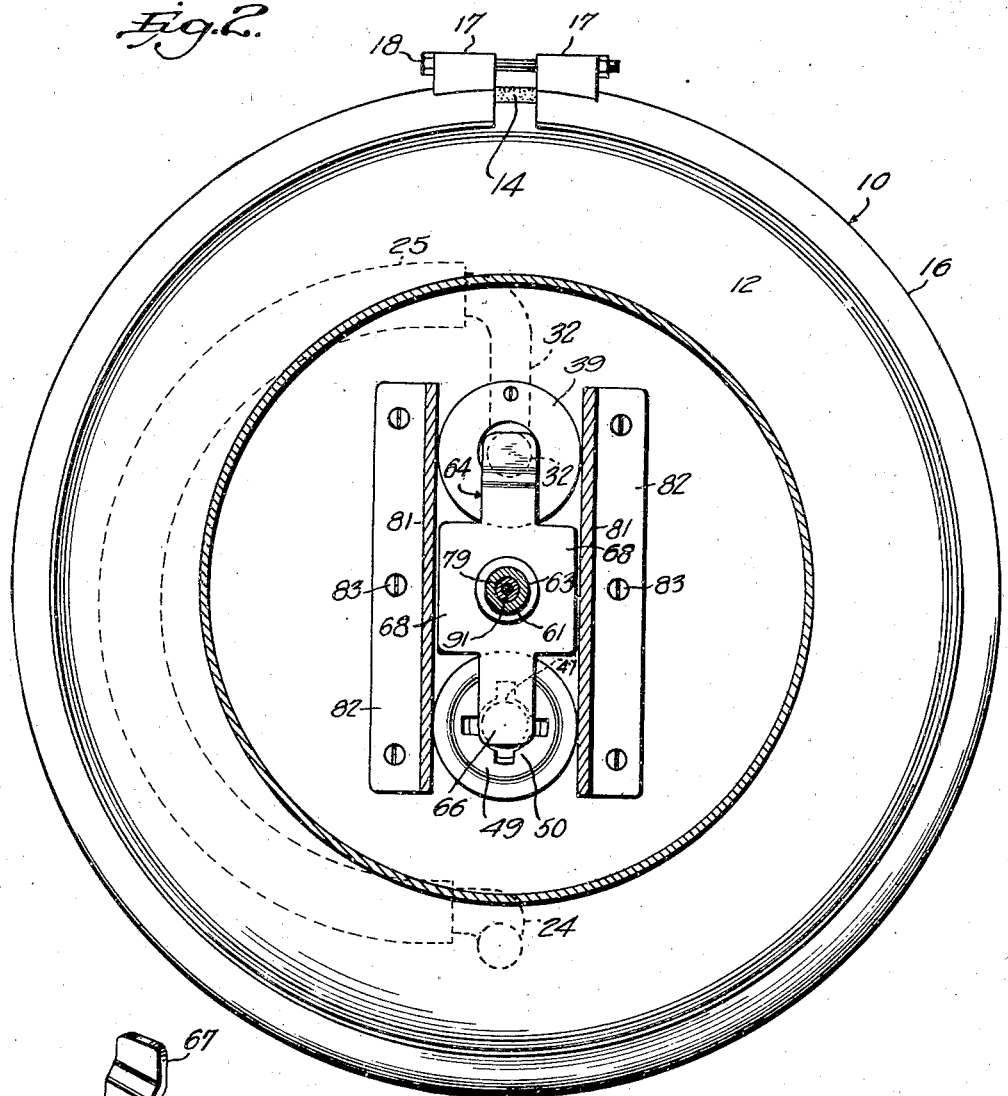
Figure 3:
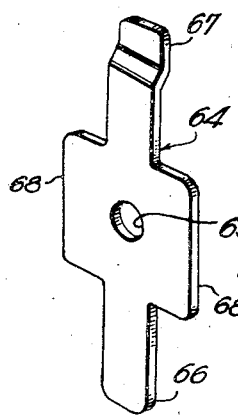

Figure 1 is an axial sectional view through the booster unit, elements of the braking system and the intake manifold of the motor vehicle engine being diagrammatically represented, Figure 2 is a section on line 2—2 of Figure 1, and Figure 3 is a detail perspective view of the valve operating lever.

Referring to the drawings the numeral 10 designates the booster motor shown in the present instance as being of the fluid pressure operated type and comprising casing sections 11 and 12 having peripheral flanges 13 between which is arranged the peripheral portion 14 of a flexible diaphragm 15 to be referred to later. The flanges 13 are clamped in position by a split band 16 of generally V-shaped section as shown at the bottom of Figure 1, the free ends of the band carrying lugs 17 through which passes a clamping bolt 18 (Figure 2).

The casing section 10 is provided with a nipple 20 to one end of which is connected a pipe 21, diagrammatically shown in Figure 1, and the other end of this pipe is tapped into the intake manifold of the vehicle engine to provide a source of pressure differential. The casing section 10 is similarly provided with a nipple 23 having its inner end 24 connected to a substantially semi-circular rubber or other flexible hose 25 for a purpose to be described. The outer end of the nipple is open to the atmosphere, preferably through a suitable conventional air cleaner (not shown). The motor 10 is provided with a pressure movable unit of which the diaphragm 15 is one main part, the other main part being in the form of a cupped plate 28 against which the radially inner portion of the diaphragm 15 is arranged. The inner periphery of the diaphragm is secured in position with respect to the plate 28 by a keeper 29 welded or otherwise secured to the plate 28. The plate is provided with a cylindrical offset 30 at one side of the center thereof and to this offset is connected an elbow 31 communicating with the interior of the offset 30 and having one end of a nipple 32 connected thereto. The other end of this nipple is connected to the other end of the hose 25 as shown in Figures 1 and 2. Thus the interior of the cylindrical offset 30 is in constant communication with the atmosphere.

A generally cylindrical valve element 33, preferably formed of sheet metal, is adapted to control communication between the opposite motor chambers 34 and 35. The valve 33 is provided with an outstanding annular flange 36 normally urged into engagement with a rubber or similar seat 37 by means of a compression spring 38. The rubber washer 37 lies against the adjacent face of the plate 28 and is held in position by a flat keeper plate 39 secured to the plate 28 in any suitable manner, as by screws 40. It will be apparent that the flange 36 forms the valve proper and is normally in engagement with the washer 37 to disconnect the motor chamber 35 from the air pipe 25.

Diametrically opposite the valve 33 the plate 28 is apertured as at 44 and an apertured plate 45 is welded or otherwise secured to the plate 28 adjacent the aperture 44 to serve as a seat for a spring 46 projecting into a cylindrical valve element 47. This valve is provided with an outstanding annular flange 48 normally engaging a keeper 49 having fingers 50 overhanging the flange 48 while affording communication around the flange 50. A rubber seat 51 is secured against the plate 28 and has an axial opening coinciding with the aperture 44 for the flow of fluid therethrough. The washer 51 forms a seat for the valve flange 48, but this flange is normally urged away from such seat by the spring 46, thus normally affording communication between the motor chambers 34 and 35.

A cylinder indicated as a whole by the numeral 55 and preferably in the form of a casting is provided intermediate its ends with an outstanding annular flange 56 riveted or otherwise secured as at 57 to the motor casing 11. Obviously, one end of the cylinder 55 projects into the motor casing 11 as shown in Figure 1. A cup shaped piston 58 is mounted to slide in the cylinder 55 and has its right hand end as viewed in Figure 1 provided with an annular flange 59 which slidably fits the bore of the cylinder 55. The remainder of the piston 58 is of reduced size to provide an annular passage 60 therearound. The piston 58 is carried by one end of a piston sleeve 61 slidable in an axial packing ring 62 carried by the plate 28. Near its left hand extremity as viewed in Figure 1 the piston sleeve 61 carries a snap ring 63 to retain in position on the sleeve 61 a lever 64 which is apertured centrally thereof as at 65 (Figure 3) to receive the sleeve 61. The lower end 66 of the lever 64 is engageable with the conical end of the valve element 47. The other end of the lever 64 is offset as at 67 to provide an end engageable with the conical end of the valve element 33. In the normal positions of the parts shown in Figure 1 the lever ends 66 and 67 lightly engage their respective valve elements. The lever 64 is widened intermediate its ends as at 68 for a purpose to be described.

The piston sleeve 61 is slidable in a bushing 70 arranged in the inner end of the cylinder 55 and retained in position by a snap ring 71. Against this ring is arranged a felt or similar washer 72 held in position against the bushing 70 by a light compression spring 73, this spring seating against the plate 28 around the packing element 62. At the opposite side of the bushing 70 is arranged a conventional lipped packing cup 74 and this cup and the piston 58 define a control chamber 75 in one end portion of the cylinder 55.

A power piston 78 is slidable within the piston 58 as shown in Figure 1 and is mounted on the end of a piston sleeve 79. The piston sleeve 79 is adapted to be operated by the pressure responsive unit of the motor 10. A plate 80 is bent to form spaced side walls 81 (Figures 1 and 2) terminating at their ends in outwardly turned flanges 82 secured by screws 83 or other fastening elements to the plate 28. The widened lever portion 68 has clearance with respect to the walls 81 and is engageable therewith to prevent rocking of the lever 64 in its own plane about the axis of the piston sleeve 61. The plate 80 engages the adjacent end of the piston sleeve 61 to limit movement of the latter toward the left as viewed in Figure 1. A spacer plate 84 (Figure 1) is secured to the plate 80 and is engageable with the motor casing 12 to limit movement of the fluid pressure responsive elements of the motor and associated elements toward the left as viewed in Figure 1. The tubular piston 79 projects through the plates 80 and 84 and is provided with a head 85 welded or otherwise secured thereto. This head lies against the outer surface of the plate 84 and is welded thereto as at 86. It will be apparent that the pressure responsive unit of the motor, the plates 80 and 84, the piston sleeve 79 and piston 78 are movable as a unit.

A boss 90 is welded as at 91 to the motor casing 12 axially thereof as shown in Figure 1. One end of a pilot pin 91 projects through the boss 90 and is preferably welded thereto as at 92. The other end of this pin projects into the sleeve 79 a substantial distance to act as a guide for the pressure movable units of the booster.

The power-operated piston 78 seats against the base of a packing cup 95 which extends outwardly over the flange 59 and terminates in a cylindrical packing lip 96 slidable in the piston 55. The space to the right of the packing cup 95 as viewed in Figure 1 forms a pressure chamber 97. This chamber communicates through a port 98 with one end of a pipe 99, shown diagrammatically in Figure 1, and leading to the vehicle brake cylinders 100. A spring 101 in the pressure chamber 97 urges the cup 95 and piston 78 toward the left as viewed in Figure 1. A relatively heavy spring 102 urges the pressure responsive unit of the motor toward the left as viewed in Figure 1. It will be apparent therefore that all of the parts of the apparatus tend to return to their normal positions shown in Figure 1.

The cylinder casting 55 is provided with a passage 105 one end of which is connected to one end of a diagrammatically illustrated pipe 106 leading to a conventional master cylinder 107 the piston of which (not shown) is operable by the usual pedal 108. The other end of the passage 105 communicates with the passage 60 formed by the reduced portion of the piston 58. The bore of the cylinder 97 is provided with a groove 109 which starts from zero depth to the right of the flange 96 of the packing cup 95 and increases in depth toward the left in Figure 1 to the passage 105 with which it communicates. The groove 109 merely provides for the small leakage necessary for replenishing the leakage of fluid from the pressure end of the system. The slight depth of the groove 109 and the sloping of this groove upwardly toward the right as stated above permits the packing cup flange 96 to move toward the right to build up pressure in the chamber 97 without being damaged by the groove 109.

The operation of the apparatus is as follows:

The parts of the booster mechanism are normally position as shown in Figure 1. The pipe 106 is connected to the master cylinder 107 and is in constant communication with the control chamber 75. The leakage groove 109 affords fixed communication between the passage 105 and the pressure chamber 97 when the parts are in normal position. The valves 33 and 47 occupy the normal positions shown in Figure 1, the valve 33 closing communication between the chamber 35 and the air pipe 25 while the valve 47 has its flange lifted from the resilient seat 55 to connect the chambers 34 and 35. The chamber 34 is in communication with the intake manifold 22 at all times, as will be apparent, and the pressure responsive unit of the motor accordingly is normally "vacuum suspended." It will be understood that vacuum operation of the motor is preferred, but that the connection 20 may be opened to the atmosphere and the connection 23 connected to a source of super-atmospheric pressure to utilize such pressure in the operation of the motor.

When the operator depresses the brake pedal 108, brake fluid will be displaced from the master cylinder through pipe 106 into the control chamber 75. The fluid entering such chamber will move the piston 58 toward the right as viewed in Figure 1. This movement will be relatively slight prior to operation of the motor 10, as will become apparent, and this movement is permitted by the resiliency of the packing cup 95. Movement of the piston 58 transmits movement to the center of the lever 64 through the ring 63. The spring 38 is more strongly tensioned than the spring 46, and accordingly movement of the lever 64 will take place with the lever fulcrumed at its point of contact with the valve 33, the opposite end of the lever moving to effect movement of the valve 47 to engage its flange 48 against the seat 51, thus closing communication between the motor chambers 34 and 35. Very slight movement is necessary to perform this operation due to the limited necessary movement of the valve 47 and due to the fact that the end 66 of the lever 64 moves approximately twice the distance of movement of the center of the lever 64.

Movement of the valve 47 will be limited to the point where the flange 48 engages the seat 51, and slight additional movement of the lever 64 will effect movement of the valve 33 to move it from its seat 37, thus admitting air through pipe 25, nipple 32 and elbow 31 into the motor chamber 35. Differential pressure will thus be established in the chambers of the motor to effect movement of the pressure responsive unit to the right as viewed in Figure 1. The tubular piston rod 79 having its left hand end (Figure 1) fixed with respect to the pressure movable unit by plates 80 and 84, movement of the pressure movable unit will effect power operation of the piston 78.

Thus the piston 58 will be moved by foot-generated pressure in the master cylinder while the piston 78 will be power operated, both of these pistons moving toward the right to transmit similar movement to the packing cup 95 and displace fluid from the pressure chamber 97 into the brake cylinders. Accordingly the operator performs part of the work in applying the brakes, the other part being performed by the motor. The proportionate amount of work performed by the operator and by the motor will depend upon the proportionate effective areas of the pistons 58 and 78. These elements obviously may be readily designed whereby the operator will perform any desired proportion of the work.

While poppet valves are employed, a perfect follow-up action is provided. The operator may move the brake pedal 108 any desired distance to effect the desired brake pressure, resistance to movement of the brake being progressively built up since increasing pressures in the chamber 97 will react through the piston 58 to resist movement of the pedal 108. Assuming that the pedal is moved a given distance and then stopped, movement of the center of the lever 64 will be arrested. Slight additional movement of the pressure movable unit of the motor toward the right as viewed in Figure 1 will result in the seating of the valve flange 36 on the seat 38 to disconnect the motor chamber 35 from the air pipe 25. Thus movement of the pressure movable unit will be arrested. If further brake application is then desired, the brake pedal 108 will be further depressed, resulting in a subsequent opening of the valve 33 to admit more air into the chamber 35.

When the brake is released, fluid will flow from the control chamber 75 back into the master cylinder 107. The valve 33, which will have been closed when movement of the brake pedal downwardly was arrested will remain closed, and the lever end 66 will release the valve 47 to permit the spring 46 to unseat such valve and again connect the motor chambers 34 and 35. Air will thus flow from the chamber 35 to the chamber 34 to reduce the differential pressures on opposite sides of the pressure movable member. The springs 101 and 102 will progressively return the parts to normal position. Of course the brakes may be partially released by permitting movement of the brake pedal 108 only partially to its normal position. In such case the valves will again follow-up with respect to movement of the brake pedal 108, and as the pressure movable member, in moving to the left as viewed in Figure 1, approaches a position corresponding to the position of the brake pedal, the lever end 66 will engage the valve flange 48 with the seat 51 to prevent any further escape of air from the motor chamber 35 into the chamber 34. Any tendency for the pressure movable unit to move beyond a position corresponding to the position of the brake pedal, will cause the lever end 67 to effect relative movement of the valve 33 to "crack" this valve to admit air into the motor chamber 35 and thus arrest further movement of the pressure movable member.

It will be apparent that the present device eliminates one of the two cylinders now commonly employed in a device of this character. Ordinarily an axial cylinder is carried by each of the motor casings 11 and 12, one receiving a valve-operating piston operable by fluid displaced from the master cylinder, and the other having therein a piston to build up pressure in a chamber corresponding to the pressure chamber 97. In the present construction only the cylinder 55 is provided, this cylinder being only slightly longer than either of the two separate cylinders previously employed. Obviously such arrangement reduces the weight of the booster unit; it reduces the amount of material used; it reduces the cost of manufacture by eliminating the necessity of casting and finishing two cylinders; and it reduces the axial length of the device, thus permitting its installation at points in motor vehicles in which the former type of mechanism cannot be installed.

The valve mechanism including the two valves and the lever 64 is not a part of the present invention. However, the present arrangement of parts makes it wholly practicable to utilize such a valve mechanism with a booster motor of this type employing only a single cylinder having both the control and pressure chambers therein, this being possible for the coaxial arrangement of the piston sleeves 61 and 79. The device is highly accurate in response to movement of the brake pedal 108 and provides for a perfect follow-up action of the pressure responsive unit of the motor with respect to the brake pedal. The operator performs any desired proportion of the work in applying the brakes according to the design of the pistons 58 and 78.

The leakage groove 109 provides for the replenishing of any fluid which may leak from the pressure end of the system during a brake application, this groove being open at its shallower end to the pressure chamber 97 when the parts are in normal position. It is pointed out that ports over which a packing cup operates are highly disadvantageous because of the tendency of the edge of such ports to cut the cup. The present arrangement, however, provides novel means for affording limited communication for the flow of leakage fluid into the pressure end of the system to replenish leakage. The groove 109 is shallow and tapers to zero depth just to the right of the flange 96 of the cup. Initial movement of the cup 95 displaces fluid from the chamber 97 to take up slack between the brakes and brake drums and this operation is accomplished without building up appreciable pressure in the chamber 97. There is little tendency, therefore, for any radial expansion of the adjacent portion of the cup flange 96 into the groove 109, and what little tendency is present occurs at a point where the groove 109 is of negligible depth and presents no sharp edges to tend to cut the flange 96.

Particular attention is invited to the fact that one of the principal practical difficulties which has been encountered in devices of this character has been the provision of a packing cup corresponding to the cup 95 which would withstand pressures in the chamber 97 without leakage and without relatively quickly wearing out. In ordinary devices of this character, there is a great difference in the pressure in the brake pressure chamber and in the adjacent chamber of the motor, and this is particularly true where a vacuum suspended motor is employed. It has been attempted to overcome this difficulty by additionally packing behind the pressure piston, but all efforts along this line have failed to provide the desired degree of perfection.

With the present mechanism, the advantage of a single cylinder containing both the control and pressure chambers is utilized as described above and provides a second highly important advantage in that it very greatly reduces differential pressures on opposite sides of the packing cup 95. It will be apparent that as pressure progressively increases in the chamber 97, correspondingly increasing pressures occur in the chamber 75. While pressure in the chamber 75 is always below the pressure in the chamber 97, the difference in the two pressures is much less than pressures occurring in prior devices between the high pressure chamber and the adjacent chamber of the fluid pressure operated motor. One of the greatest obstacles encountered in a device of this character is thus overcome and the packing cup 95 will effectively seal the chamber 97 and will last far longer than the packing cups of prior constructions. The life of the packing cup is also lengthened by the fact that the flange 96 operates always over a thoroughly wetted surface, there being brake fluid at all times in both of the chambers 75 and 97 as will be obvious.

Moreover, tensions to which the motor casings 11 and 12 are subjected are materially reduced by the use of a single cylinder 55 carried by one motor casing. Accordingly the shells or casings 11 and 12 may be made of lighter material.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A brake operating mechanism for a hydraulic brake system having a hydraulic brake cylinder and a pedal-controlled master cylinder, comprising a fluid cylinder one end of which communicates with the brake cylinder and forms a pressure chamber, a fluid-displacing element movable toward such end of said fluid cylinder to displace fluid therefrom into the brake cylinder, the other end of said fluid cylinder being closed and forming a control chamber communicating with the master cylinder, a motor carrying said fluid cylinder, a control mechanism for said motor arranged therewithin, and means axially movable by fluid displaced into said control chamber from the master cylinder to operate said control mechanism, said motor having a power-movable unit connected to said fluid displacing element to effect movement thereof toward the pressure chamber end of said fluid cylinder upon energization of said motor, said axially movable means having a portion arranged to directly enter said pressure chamber to boost the hydraulic pressure therein.

2. A brake operating mechanism for a hydraulic brake system having a hydraulic brake cylinder and a pedal-controlled master cylinder, comprising a fluid cylinder one end of which communicates with the brake cylinder and forms a pressure chamber, a fluid-displacing element movable toward such end of said fluid cylinder to displace fluid therefrom into the brake cylinder, the other end of said fluid cylinder being closed and forming a control chamber communicating with the master cylinder, a motor carrying said fluid cylinder, and having a power-movable unit, a control mechanism for said motor arranged therewithin, and a pair of elements relatively movable parallel to each other axially of said motor, one of the elements of said pair connecting said fluid displacing element to said power-movable unit and the other element of said pair being connected to said control mechanism and being operable by fluid displaced into said control chamber from said master cylinder, said other element of said pair having a portion arranged to directly enter said pressure chamber to boost the hydraulic pressure therein.

3. A brake operating mechanism for a hydraulic brake system having a hydraulic brake cylinder and a pedal-controlled master cylinder, comprising a fluid cylinder one end of which communicates with the brake cylinder and forms a pressure chamber, a fluid-displacing element movable toward such end of said fluid cylinder to displace fluid therefrom into the brake cylinder, the other end of said fluid cylinder being closed and forming a control chamber communicating with the master cylinder, a motor carrying said fluid cylinder and having a power-movable unit, a control mechanism having control elements carried by said power movable unit and a lever device for operating said control elements, and a pair of elements relatively movable parallel to each other axially of said motor, one element of said pair connecting said power-movable unit to said piston, the other element of said pair having operative engagement with said lever device and being operable by fluid displaced into said control chamber from the master cylinder, said other element of said pair having a portion arranged to directly enter said pressure chamber to boost the hydraulic pressure therein.

4. A brake operating mechanism for a hydraulic brake system having a hydraulic brake cylinder and a pedal-controlled master cylinder, comprising a fluid cylinder one end of which communicates with the brake cylinder and forms a pressure chamber, a fluid-displacing element movable toward such end of said fluid cylinder to displace fluid therefrom into the brake cylinder, the other end of said fluid cylinder being closed and forming a control chamber communicating with the master cylinder, a motor carrying said fluid cylinder and having a power-movable unit therein, a second piston movable in said fluid cylinder and defining one end of said control chamber, said second piston having an annular flange portion surrounding the first named piston and movable therewith to displace fluid from said pressure chamber, means connecting said power-movable unit with said first named piston, and means for controlling said motor by movement of said second piston incident to the displacement of fluid into said control chamber from the master cylinder, said second piston being movable relative to the first named piston.

5. A brake operating mechanism for a hydraulic brake system having a hydraulic brake cylinder and a pedal-controlled master cylinder, comprising a fluid cylinder one end of which communicates with the brake cylinder and forms a pressure chamber, a fluid-displacing element movable toward such end of said fluid cylinder to displace fluid therefrom into the brake cylinder, the other end of said fluid cylinder being closed and forming a control chamber communicating with the master cylinder, a motor carrying said fluid cylinder and having a power-movable unit therein, a second piston movable in said fluid cylinder and defining one end of said control chamber, said second piston having an annular flange portion surrounding the first named piston and movable therewith to displace fluid from said pressure chamber, means connecting said power movable unit with said first named piston, a rod projecting from the control chamber end of said fluid cylinder and connected to said second piston, and a control mechanism operable by said rod, said second piston being movable relative to the first piston in accordance with variations in the capacity of said control chamber to operate said rod and control said motor.

6. A brake operating mechanism for a hydraulic brake system having a hydraulic brake cylinder and a pedal-controlled master cylinder, comprising a fluid cylinder one end of which communicates with the brake cylinder and forms a pressure chamber, a fluid-displacing element movable toward such end of said fluid cylinder to displace fluid therefrom into the brake cylinder, the other end of said fluid cylinder being closed and forming a control chamber communicating with the master cylinder, a motor carrying said fluid cylinder and having a power-movable unit therein, a second piston movable in said fluid cylinder and defining one end of said control chamber, said second piston having an annular flange portion surrounding the first named piston and movable therewith to displace fluid from said pressure chamber, a piston rod connecting the first named piston to said power movable unit, a control mechanism for said motor, and a sleeve slidably surrounding said piston rod and connected at one end to said second piston, the other end of said sleeve being connected to said control mechanism to operate it in accordance with the relative positions of said pistons, said pistons being movable relative to each other.

7. A brake operating mechanism for a hydraulic brake system having a hydraulic brake cylinder and a pedal-controlled master cylinder, comprising a fluid cylinder one end of which communicates with the brake cylinder and forms a pressure chamber, a fluid-displacing element movable toward such end of said fluid cylinder to displace fluid therefrom into the brake cylinder, the other end of said fluid cylinder being closed and forming a control chamber communicating with the master cylinder, a motor carrying said fluid cylinder and having a power-movable unit therein, a second piston movable in said fluid cylinder and defining one end of said control chamber, said second piston having an annular flange portion surrounding the first named piston and movable therewith to displace fluid from said pressure chamber, a piston rod connecting the first named piston to said power movable unit, a control mechanism for said motor comprising a pair of control elements carried by said power movable unit and a lever device for operating said pair of elements, and a sleeve slidably surrounding said piston rod, one end of said sleeve being connected to the second piston and the other end having operative engagement with said lever device to effect movement of said control elements upon relative movement of said pistons, said pistons being movable relative to each other.

8. A brake operating mechanism for a hydraulic brake system having a hydraulic brake cylinder and a pedal-controlled master cylinder, comprising a differential fluid pressure operated motor having a pressure movable unit therein and having an end member at one end thereof, an axially arranged fluid cylinder carried by said end member and having one end forming a pressure chamber communicating with the brake cylinder, a fluid-displacing piston connected to said pressure movable unit and movable toward such end of the fluid cylinder to displace fluid therefrom into the brake cylinder, the other end of said fluid cylinder being closed and forming a control chamber communicating with the master cylinder, a control valve mechanism for said motor arranged therewithin, and means axially movable by fluid displaced into said control chamber from the master cylinder to operate said control valve mechanism to energize said motor, said axially movable means having a portion arranged to directly enter said pressure chamber to boost the hydraulic pressure therein.

9. A brake operating mechanism for a hydraulic brake system having a hydraulic brake cylinder and a pedal-controlled master cylinder, comprising a differential fluid pressure operated motor having a pressure movable unit therein and having an end member at one end thereof, an axially arranged fluid cylinder carried by said end member and having one end forming a pressure chamber communicating with the brake cylinder, a fluid-displacing piston movable toward such end of the fluid cylinder to displace fluid therefrom into the brake cylinder, the other end of said fluid cylinder being closed and forming a control chamber communicating with the master cylinder, a control valve mechanism for said motor arranged therewithin, and a pair of elements relatively movable parallel to each other axially of said motor, one of said elements connecting said piston to said pressure movable unit and the other element being connected to said control valve mechanism and being operable by fluid displaced into said control chamber from said master cylinder, said other element of said pair having a portion arranged to directly enter said pressure chamber to boost the hydraulic pressure therein.

10. A brake operating mechanism for a hydraulic brake system having a hydraulic brake cylinder and a pedal-controlled master cylinder, comprising a differential fluid pressure operated motor having a pressure movable unit therein and having an end member at one end thereof, an axially arranged fluid cylinder carried by said end member and having one end forming a pressure chamber communicating with the brake cylinder, a fluid-displacing piston movable toward such end of the booster cylinder to displace fluid therefrom into the brake cylinder, the other end of said fluid cylinder being closed and forming a control chamber communicating with the master cylinder, a control valve mechanism for said motor arranged therewithin, said control valve mechanism having valve elements carried by said pressure movable unit and a lever device for operating said valve elements, and a pair of elements relatively movable parallel to each other axially of said motor, one element of said pair connecting said pressure movable unit to said piston, the other element of said pair having operative engagement with said lever device and being operable by fluid displaced into said control chamber from the master cylinder, said other element of said pair having a portion arranged to directly enter said pressure chamber to boost the hydraulic pressure therein.

11. A brake operating mechanism for a hydraulic brake system having a hydraulic brake cylinder and a pedal-controlled master cylinder, comprising a differential fluid pressure operated motor having a pressure movable unit therein and having an end member at one end thereof, an axially arranged fluid cylinder carried by said end member and having one end forming a pressure chamber communicating with the brake cylinder, a fluid-displacing piston connected to said pressure movable unit and movable toward such end of the booster cylinder to displace fluid therefrom into the brake cylinder, the other end of said fluid cylinder being closed and forming a control chamber communicating with the master cylinder, a control valve mechanism for said motor arranged therewithin, a second piston movable in said fluid cylinder and defining one end of said control chamber, said second piston having an annular flange portion surrounding the first named piston and movable therewith to displace fluid from said pressure chamber, and means for operating said control valve mechanism by said second piston incident to the displacing of fluid into said control chamber from the master cylinder, said second named piston being movable relative to said first named piston.

12. A brake operating mechanism for a hydraulic brake system having a hydraulic brake cylinder and a pedal-controlled master cylinder, comprising a differential fluid pressure operated motor having a pressure movable unit therein and having an end member at one end thereof, an axially arranged fluid cylinder carried by said end member and having one end forming a pressure chamber communicating with the brake cylinder, a fluid-displacing piston movable toward such end of the booster cylinder to displace fluid therefrom into the brake cylinder, the other end of said fluid cylinder being closed and forming a control chamber communicating with the master cylinder, a control valve mechanism for said motor arranged therewithin, a second piston movable in said fluid cylinder and defining one end of said control chamber, said second piston having an annular flange portion surrounding the first named piston and movable therewith to displace fluid from said pressure chamber, a piston rod connecting the first named piston to said pressure movable unit, and a sleeve slidably surrounding said piston rod and having its respective ends mechanically connected to said second piston and to said valve mechanism, said pistons being movable relative to each other.

13. A brake operating mechanism for a hydraulic brake system having a hydraulic brake cylinder and a pedal-controlled master cylinder, comprising a differential fluid pressure operated motor having a pressure movable unit therein and having an end member at one end thereof, an axially arranged fluid cylinder carried by said end member and having one end forming a pressure chamber communicating with the brake cylinder, and a fluid-displacing piston connected to said pressure movable unit and movable toward such end of the booster cylinder to displace fluid therefrom into the brake cylinder, the other end of said fluid cylinder being closed and forming a control chamber communicating with the master cylinder, a control valve mechanism for said motor arranged therewithin and having a pair of valve elements carried by said pressure movable unit on opposite sides of the axis thereof, one valve element controlling communication between opposite ends of the motor and the other controlling communication between one end of said motor and a source of pressure differential, and a lever having end portions mechanically engaging said valve elements, and a pair of elements relatively movable parallel to each other axially of said motor, one element of said pair connecting said pressure movable unit to said piston, the other element of said pair having operative engagement with said lever centrally thereof and being operable by fluid displaced into said control chamber from the master cylinder, said other element of said pair having a portion arranged to directly enter said pressure chamber to boost the hydraulic pressure therein.

14. A brake operating mechanism for a hydraulic brake system having a hydraulic brake cylinder and a pedal-controlled master cylinder, comprising a differential fluid pressure operated motor having a pressure movable unit therein and having an end member at one end thereof, an axially arranged fluid cylinder carried by said end member and having one end forming a pressure chamber communicating with the brake cylinder, a fluid-displacing piston movable toward such end of the booster cylinder to displace fluid therefrom into the brake cylinder, the other end of said fluid cylinder being closed and forming a control chamber communicating with the master cylinder, a control valve mechanism for said motor arranged therewithin and having a pair of valve elements carried by said pressure movable unit on opposite sides of the axis thereof, one valve element controlling communication between opposite ends of the motor and the other controlling communication between one end of said motor and a source of pressure differential, and a lever having end portions mechanically engaging said valve elements, a second piston movable in said fluid cylinder and defining one end of said control chamber, said second piston having an annular flange portion surrounding said first named piston and movable therewith to displace fluid from said pressure chamber, a piston rod connecting the first named piston to said pressure movable unit, and a sleeve slidably surrounding said piston rod and having one end connected to the second piston, the other end of said sleeve having mechanical engagement with said lever centrally of the length thereof, said pistons being movable relative to each other.

WILLIAM STELZER.